United States Patent
Mashal (10) Patent No.: US 11,739,461 B1
(45) Date of Patent: Aug. 29, 2023

(54) SYSTEMS AND METHODS FOR MONITORING TURNOVER PERFORMANCE

(71) Applicant: Haier US Appliance Solutions, Inc., Wilmington, DE (US)

(72) Inventor: Khalid Jamal Mashal, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/684,504

(22) Filed: Mar. 2, 2022

(51) Int. Cl.
| | |
|---|---|
| *D06F 34/18* | (2020.01) |
| *D06F 33/30* | (2020.01) |
| *D06F 34/20* | (2020.01) |
| *G06T 7/20* | (2017.01) |
| *D06F 105/48* | (2020.01) |
| *D06F 103/04* | (2020.01) |

(52) U.S. Cl.
CPC .............. *D06F 34/18* (2020.02); *D06F 33/30* (2020.02); *D06F 34/20* (2020.02); *G06T 7/20* (2013.01); *D06F 2103/04* (2020.02); *D06F 2105/48* (2020.02)

(58) Field of Classification Search
CPC ....................................................... D06F 34/18
See application file for complete search history.

(56) References Cited

U.S. PATENT DOCUMENTS

| | | |
|---|---|---|
| 8,528,229 B2 | 9/2013 | Ashrafzadeh |
| 10,829,886 B2 | 11/2020 | Ashrafzadeh et al. |

FOREIGN PATENT DOCUMENTS

| | | |
|---|---|---|
| CN | 101661618 A | 3/2010 |
| CN | 109594286 A | 4/2019 |
| DE | 102013215221 A1 | 2/2015 |
| WO | WO2020215777 A1 | 10/2020 |
| WO | WO2021025196 A1 | 2/2021 |

OTHER PUBLICATIONS

Andy Loomis, "Tracking and Structure from Motion", Dec. 12, 2011, http://cs.brown.edu/courses/csci1430/2011/results/proj5/aloomis/.

*Primary Examiner* — Jason Y Ko
(74) *Attorney, Agent, or Firm* — Dority & Manning, P.A.

(57) ABSTRACT

A washing machine appliance includes a wash basket that is rotatably mounted within a wash tub and that defines a wash chamber for receiving a load of clothes. A motor assembly is mechanically coupled to the wash basket for selectively rotating the wash basket and a camera assembly is mounted within the cabinet in view of the wash chamber. A controller is configured to obtain a series of image frames using the camera assembly during a wash cycle, identify a tracking point on a clothing article, generate a motion path of the tracking point over the series of image frames using an optical flow technique, estimate a turnover rate of the load of clothes based at least in part on the motion path of the clothing article, and implement responsive action in response to determining that the turnover rate falls below a predetermined threshold rate.

20 Claims, 7 Drawing Sheets

SYSTEMS AND METHODS FOR MONITORING TURNOVER PERFORMANCE

FIELD OF THE INVENTION

The present subject matter relates generally to washing machine appliances, or more specifically, to systems and methods for assessing turnover performance in a top load washing machine appliance.

BACKGROUND OF THE INVENTION

Washing machine appliances generally include a cabinet which receives a wash tub for containing water or wash fluid (e.g., water and detergent, bleach, or other wash additives). The wash tub may be suspended within the cabinet by a suspension system to allow some movement relative to the cabinet during operation. A wash basket is rotatably mounted within the wash tub and defines a wash chamber for receipt of articles for washing. A drive assembly is coupled to the wash tub and is configured to selectively rotate the wash basket within the wash tub. In certain top load washing machines, an agitator or impeller may reside at the bottom of the wash basket to aid in movement of the articles being washed.

Wash performance is dependent, in part, on sufficient turnover of the articles to be washed during wash (and rinse) cycles. Turnover is a measure of the movement of such articles within the wash tub during washing. When turnover is inadequate, the articles being washed remain relatively stagnant during the wash cycle, thus decreasing mechanical agitation and failing to expose dirt and stains on some surfaces of the articles being washed. Certain conventional washing machine appliances lack any mechanism for determining the turnover performance of the appliance during operation by the user. In some cases, lower water pressure at a user's home may lead to lower water levels during a wash cycle, which can negatively impact turnover performance. In another case, users may employ improper wash cycles for the type of load, leading to agitation profiles that are too strong or weak, once again decreasing turnover performance. In at least each of these cases, many conventional washing machine appliances are unable to adjust to the specific conditions during operation to optimize wash performance.

Accordingly, an apparatus and method for addressing operational turnover performance in washing machine appliances is desirable. More specifically, a washing machine appliance that is capable assessing turnover performance and adjusting operating parameters of the appliance during a given cycle to improve performance would be particularly beneficial.

BRIEF DESCRIPTION OF THE INVENTION

Advantages of the invention will be set forth in part in the following description, or may be apparent from the description, or may be learned through practice of the invention.

In one exemplary embodiment, a washing machine appliance is provided including a wash tub positioned within a cabinet, a wash basket rotatably mounted within the wash tub and defining a wash chamber configured for receiving a load of clothes, a motor assembly mechanically coupled to the wash basket for selectively rotating the wash basket, a camera assembly mounted within the cabinet in view of the wash chamber, and a controller operably coupled to the motor assembly and the camera assembly. The controller is configured to: initiate a wash cycle to agitate the load of clothes; obtain a series of image frames using the camera assembly; identify a tracking point on a clothing article from the load of clothes using a first image frame from the series of image frames; generate a motion path of the tracking point over the series of image frames using an optical flow technique; estimate a turnover rate of the load of clothes based at least in part on the motion path of the clothing article; determine that the turnover rate falls below a predetermined threshold rate; and implement a responsive action in response to determining that the turnover rate falls below the predetermined threshold rate.

In another exemplary embodiment, a method of operating a washing machine appliance is provided. The washing machine appliance includes a wash basket rotatably mounted within a wash tub and defining a wash chamber configured for receiving a load of clothes, a motor assembly for selectively rotating the wash basket, and a camera assembly mounted within view of the wash chamber. The method includes initiating a wash cycle to agitate the load of clothes; obtaining a series of image frames using the camera assembly; identifying a tracking point on a clothing article from the load of clothes using a first image frame from the series of image frames; generating a motion path of the tracking point over the series of image frames using an optical flow technique; estimating a turnover rate of the load of clothes based at least in part on the motion path of the clothing article; determining that the turnover rate falls below a predetermined threshold rate; and implementing a responsive action in response to determining that the turnover rate falls below the predetermined threshold rate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
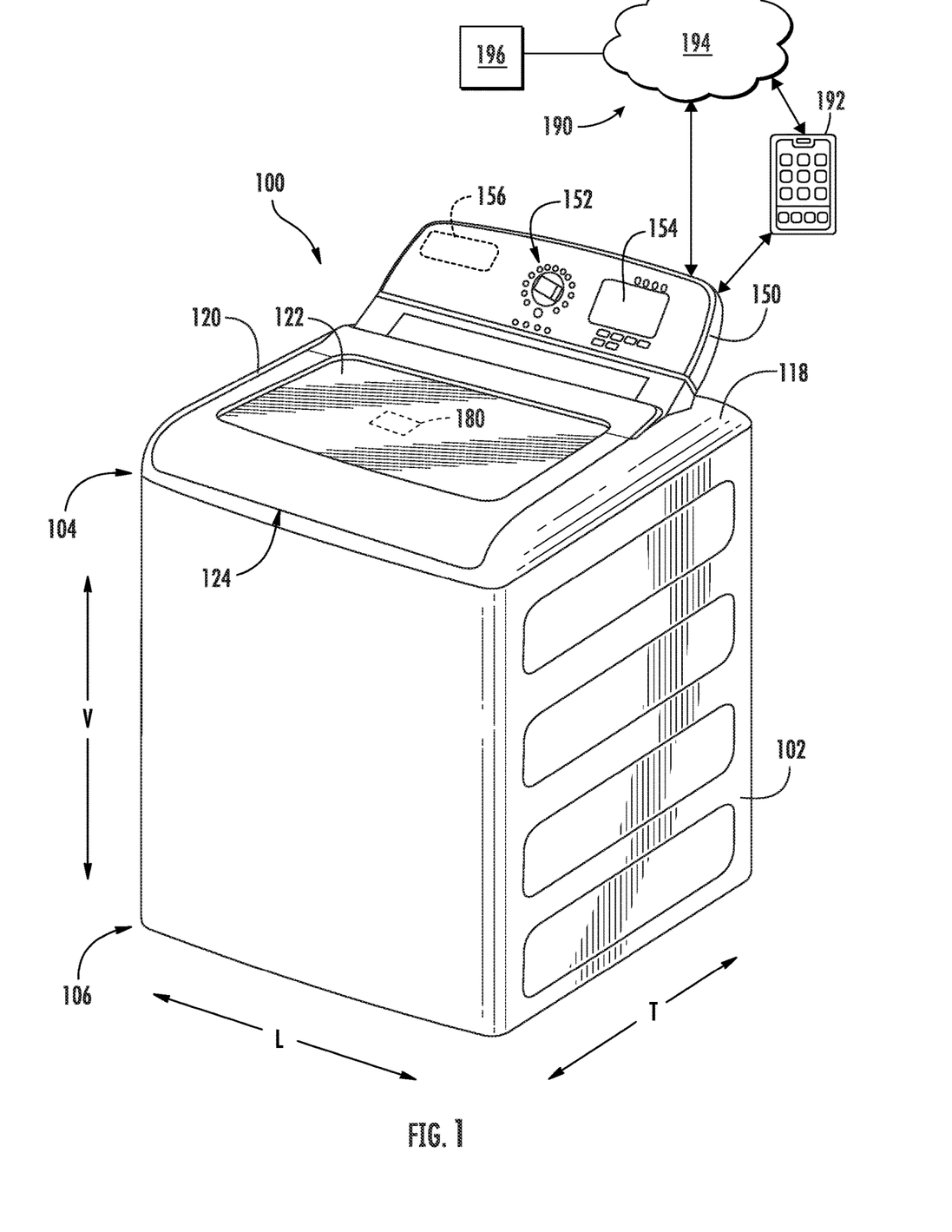
FIG. 1 provides a perspective view of a washing machine appliance according to an exemplary embodiment of the present subject matter with a door of the exemplary washing machine appliance shown in a closed position.
Figure 2:
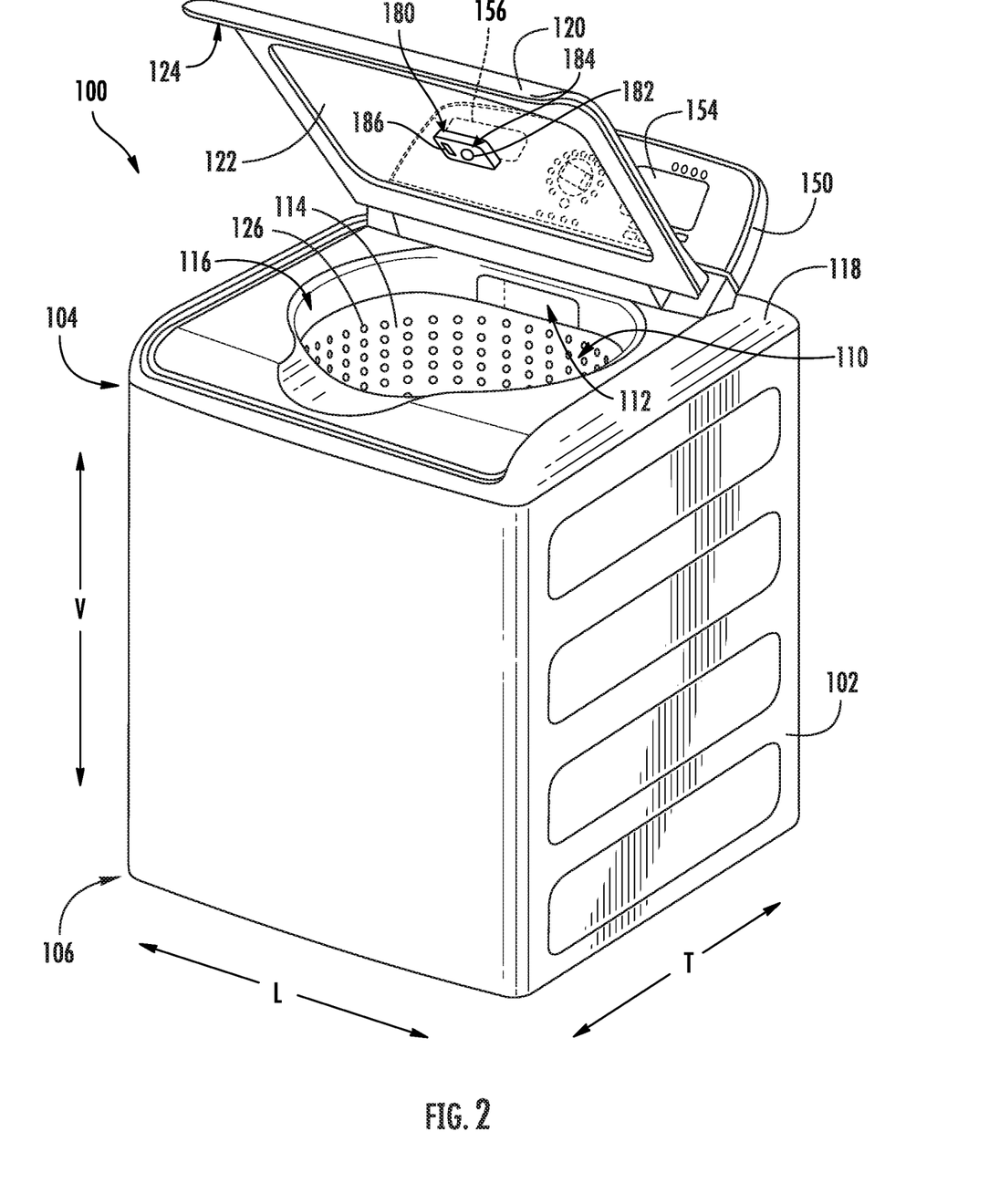
FIG. 2 provides a perspective view of the exemplary washing machine appliance of FIG. 1 with the door of the exemplary washing machine appliance shown in an open position.
Figure 3:
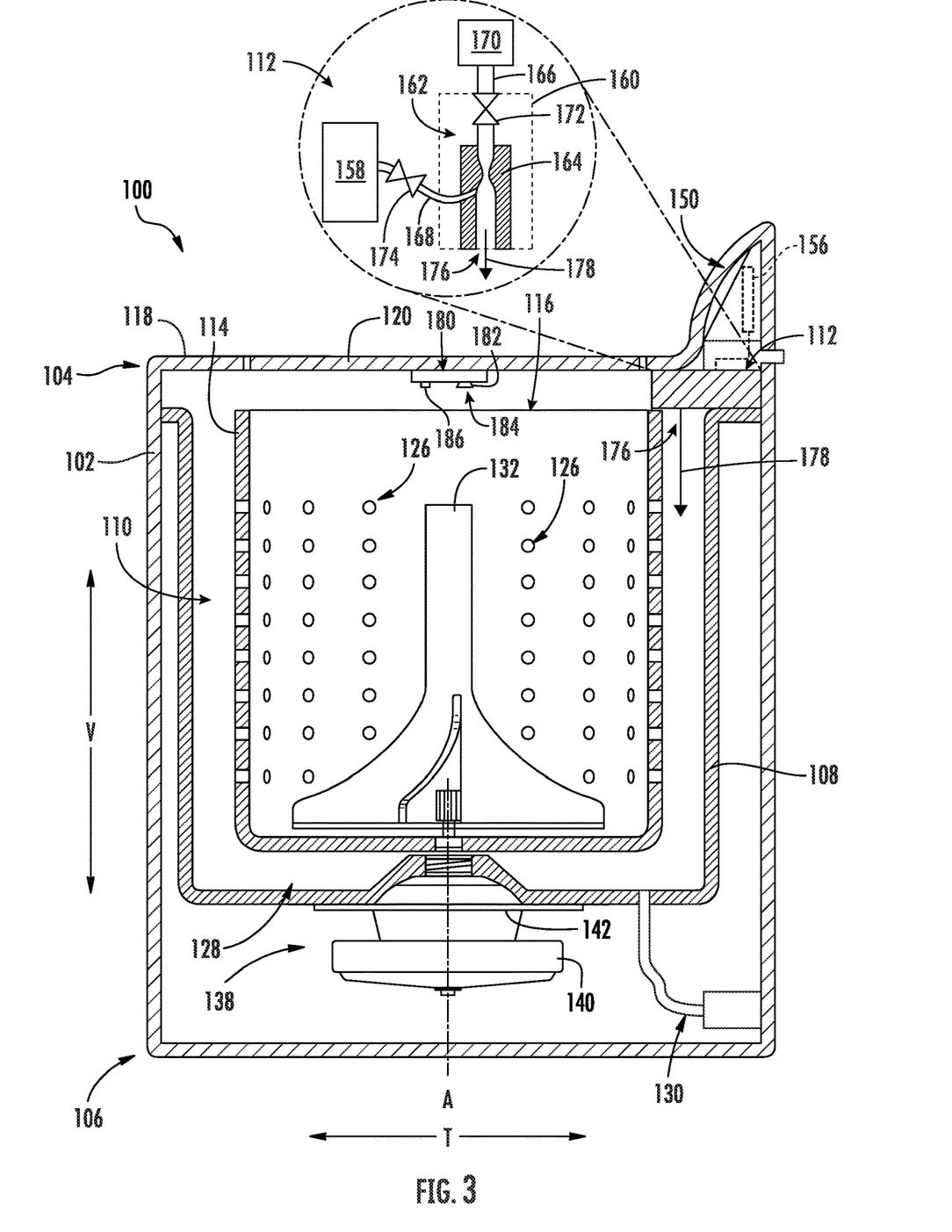
FIG. 3 provides a side cross-sectional view of the exemplary washing machine appliance of FIG. 1.

FIGS. 1 through 3 illustrate an exemplary embodiment of a vertical axis washing machine appliance 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 100, it should be appreciated that vertical axis washing machine appliance 100 is provided by way of example only. It will be understood that aspects of the present subject matter may be used in any other suitable washing machine appliance, such as a horizontal axis washing machine appliance. Indeed, modifications and variations may be made to washing machine appliance 100, including different configurations, different appearances, and/or different features while remaining within the scope of the present subject matter.

Washing machine appliance 100 has a cabinet 102 that extends between a top portion 104 and a bottom portion 106 along the vertical direction V, between a first side (left) and a second side (right) along the lateral direction L, and between a front and a rear along the transverse direction T. As best shown in FIG. 3, a wash tub 108 is positioned within cabinet 102, defines a wash chamber 110, and is generally configured for retaining wash fluids during an operating cycle. Washing machine appliance 100 further includes a primary dispenser or dispensing assembly 112 (FIG. 2) for dispensing wash fluid into wash tub 108.

In addition, washing machine appliance 100 includes a wash basket 114 that is positioned within wash tub 108 and generally defines an opening 116 for receipt of articles for washing. More specifically, wash basket 114 is rotatably mounted within wash tub 108 such that it is rotatable about an axis of rotation A. According to the illustrated embodiment, the axis of rotation A is substantially parallel to the vertical direction V. In this regard, washing machine appliance 100 is generally referred to as a "vertical axis" or "top load" washing machine appliance 100. However, it should be appreciated that aspects of the present subject matter may be used within the context of a horizontal axis or front load washing machine appliance as well.

As illustrated, cabinet 102 of washing machine appliance 100 has a top panel 118. Top panel 118 defines an opening (FIG. 2) that coincides with opening 116 of wash basket 114 to permit a user access to wash basket 114. Washing machine appliance 100 further includes a door 120 which is rotatably mounted to top panel 118 to permit selective access to opening 116. In particular, door 120 selectively rotates between the closed position (as shown in FIGS. 1 and 3) and the open position (as shown in FIG. 2). In the closed position, door 120 inhibits access to wash basket 114. Conversely, in the open position, a user can access wash basket 114. A window 122 in door 120 permits viewing of wash basket 114 when door 120 is in the closed position, e.g., during operation of washing machine appliance 100. Door 120 also includes a handle 124 that, e.g., a user may pull and/or lift when opening and closing door 120. Further, although door 120 is illustrated as mounted to top panel 118, door 120 may alternatively be mounted to cabinet 102 or any other suitable support.

As best shown in FIGS. 2 and 3, wash basket 114 further defines a plurality of perforations 126 to facilitate fluid communication between an interior of wash basket 114 and wash tub 108. In this regard, wash basket 114 is spaced apart from wash tub 108 to define a space for wash fluid to escape wash chamber 110. During a spin cycle, wash fluid within articles of clothing and within wash chamber 110 is urged through perforations 126 wherein it may collect in a sump 128 defined by wash tub 108. Washing machine appliance 100 further includes a pump assembly 130 (FIG. 3) that is located beneath wash tub 108 and wash basket 114 for gravity assisted flow when draining wash tub 108.

An impeller or agitation element 132 (FIG. 3), such as a vane agitator, impeller, auger, oscillatory basket mechanism, or some combination thereof is disposed in wash basket 114 to impart an oscillatory motion to articles and liquid in wash basket 114. More specifically, agitation element 132 extends into wash basket 114 and assists agitation of articles disposed within wash basket 114 during operation of washing machine appliance 100, e.g., to facilitate improved cleaning. In different embodiments, agitation element 132 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitation element 132 and wash basket 114 are oriented to rotate about axis of rotation A (which is substantially parallel to vertical direction V).

As best illustrated in FIG. 3, washing machine appliance 100 includes a drive assembly or motor assembly 138 in mechanical communication with wash basket 114 to selectively rotate wash basket 114 (e.g., during an agitation or a rinse cycle of washing machine appliance 100). In addition, motor assembly 138 may also be in mechanical communication with agitation element 132. In this manner, motor assembly 138 may be configured for selectively rotating or oscillating wash basket 114 and/or agitation element 132 during various operating cycles of washing machine appliance 100.

More specifically, motor assembly 138 may generally include one or more of a drive motor 140 and a transmission assembly 142, e.g., such as a clutch assembly, for engaging and disengaging wash basket 114 and/or agitation element 132. According to the illustrated embodiment, drive motor 140 is a brushless DC electric motor, e.g., a pancake motor. However, according to alternative embodiments, drive motor 140 may be any other suitable type or configuration of motor. For example, drive motor 140 may be an AC motor, an induction motor, a permanent magnet synchronous motor, or any other suitable type of motor. In addition, motor assembly 138 may include any other suitable number, types, and configurations of support bearings or drive mechanisms.

Referring still to FIGS. 1 through 3, a control panel 150 with at least one input selector 152 (FIG. 1) extends from top panel 118. Control panel 150 and input selector 152 collectively form a user interface input for operator selection of machine cycles and features. A display 154 of control panel 150 indicates selected features, operation mode, a countdown timer, and/or other items of interest to appliance users regarding operation.

Operation of washing machine appliance 100 is controlled by a controller or processing device 156 that is operatively coupled to control panel 150 for user manipulation to select washing machine cycles and features. In response to user manipulation of control panel 150, controller 156 operates the various components of washing machine appliance 100 to execute selected machine cycles and features. According to an exemplary embodiment, controller 156 may include a memory and microprocessor, such as a general or special purpose microprocessor operable to execute programming instructions or micro-control code associated with methods described herein. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of washing machine appliance 100 may be in communication with controller 156 via one or more signal lines or shared communication busses.

During operation of washing machine appliance 100, laundry items are loaded into wash basket 114 through opening 116, and washing operation is initiated through operator manipulation of input selectors 152. Wash basket 114 is filled with water and detergent and/or other fluid additives via primary dispenser 112. One or more valves can be controlled by washing machine appliance 100 to provide for filling wash tub 108 and wash basket 114 to the appropriate level for the amount of articles being washed and/or rinsed. By way of example for a wash mode, once wash basket 114 is properly filled with fluid, the contents of wash basket 114 can be agitated (e.g., with agitation element 132 as discussed previously) for washing of laundry items in wash basket 114.

Referring again to FIGS. 2 and 3, dispensing assembly 112 may generally be configured to dispense wash fluid to facilitate one or more operating cycles or phases of an operating cycle (e.g., such as a wash cycle or a rinse cycle). The terms "wash fluid" and the like may be used herein to generally refer to a liquid used for washing and/or rinsing clothing or other articles. For example, the wash fluid is typically made up of water that may include other additives such as detergent, fabric softener, bleach, or other suitable treatments (including combinations thereof). More specifically, the wash fluid for a wash cycle may be a mixture of water, detergent, and/or other additives, while the wash fluid for a rinse cycle may be water only.

As best shown schematically in FIG. 3, dispensing assembly 112 may generally include a bulk storage tank or bulk reservoir 158 and a dispenser box 160. More specifically, bulk reservoir 158 may be positioned under top panel 118 and defines an additive reservoir for receiving and storing wash additive. More specifically, according to the illustrated embodiment, bulk reservoir 158 may contain a bulk volume of wash additive (such as detergent or other suitable wash additives) that is sufficient for a plurality of wash cycles of washing machine appliance 100, such as no less than twenty wash cycles, no less than fifty wash cycles, etc. As a particular example, bulk reservoir 158 is configured for containing no less than twenty fluid ounces, no less than three-quarters of a gallon, or about one gallon of wash additive.

Dispensing assembly 112 may include features for drawing wash additive from bulk reservoir 158 and mixing it with water prior to directing the mixture into wash tub 108 to facilitate a cleaning operation. By contrast, dispensing assembly 112 is also capable of dispensing water only. Thus, dispensing assembly 112 may automatically dispense the desired amount of water with or without a desired amount of wash additive such that a user can avoid filling dispenser box 160 with detergent before each operation of washing machine appliance 100.

For example, as best shown in FIG. 3, washing machine appliance 100 includes an aspirator assembly 162, which is a Venturi-based dispensing system that uses a flow of water to create suction within a Venturi tube to draw in wash additive from bulk reservoir 158 which mixes with the water and is dispensed into wash tub 108 as a concentrated wash fluid preferably having a target volume of wash additive. After the target volume of wash additive is dispensed into wash tub 108, additional water may be provided into wash tub 108 as needed to fill to the desired wash volume. It should be appreciated that the target volume may be preprogrammed in controller 156 according to the selected operating cycle or parameters, may be set by a user, or may be determined in any other suitable manner.

As illustrated, aspirator assembly 162 includes a Venturi pump 164 that is fluidly coupled to both a water supply conduit 166 and a suction line 168. As illustrated, water supply conduit 166 may provide fluid communication between a water supply source 170 (such as a municipal water supply) and a water inlet of Venturi pump 164. In addition, washing machine appliance 100 includes a water fill valve or water control valve 172 which is operably coupled to water supply conduit 166 and is communicatively coupled to controller 156. In this manner, controller 156 may regulate the operation of water control valve 172 to regulate the amount of water that passes through aspirator assembly 162 and into wash tub 108.

In addition, suction line 168 may provide fluid communication between bulk reservoir 158 and Venturi pump 164 (e.g., via a suction port defined on Venturi pump 164). Notably, as a flow of water is supplied through Venturi pump 164 to wash tub 108, the flowing water creates a negative pressure within suction line 168. This negative pressure may draw in wash additive from bulk reservoir 158. When certain conditions exist, the amount of wash additive dispensed is roughly proportional to the amount of time water is flowing through Venturi pump 164.

Referring still to FIG. 3, aspirator assembly 162 may further include a suction valve 174 that is operably coupled to suction line 168 to control the flow of wash additive through suction line 168 when desired. For example, suction valve 174 may be a solenoid valve that is communicatively coupled with controller 156. Controller 156 may selectively open and close suction valve 174 to allow wash additive to flow from bulk reservoir 158 through additive suction valve 174. For example, during a rinse cycle where only water is desired, suction valve 174 may be closed to prevent wash additive from being dispensed through suction valve 174. In some embodiments, suction valve 174 is selectively controlled based on at least one of the selected wash cycle, the soil level of the articles to be washed, and the article type. According to still other embodiments, no suction valve 174 is needed at all and alternative means for preventing the flow of wash additive may be used or other water regulating valves may be used to provide water into wash tub 108.

Washing machine appliance 100, or more particularly, dispensing assembly 112, generally includes a discharge nozzle 176 for directing a flow of wash fluid (e.g., identified herein generally by reference numeral 178) into wash chamber 108. In this regard, discharge nozzle 176 may be positioned above wash tub proximate a rear of opening 116 defined through top panel 118. Dispensing assembly 112 may be regulated by controller 156 to discharge wash fluid 178 through discharge nozzle 176 at the desired flow rates, volumes, and/or detergent concentrations to facilitate various operating cycles, e.g., such as wash or rinse cycles.

Although water supply conduit 166, water supply source 170, discharge nozzle 176, and water control valve 172 are all described and illustrated herein in the singular form, it should be appreciated that these terms may be used herein generally to describe a supply plumbing for providing hot and/or cold water into wash chamber 110. In this regard, water supply conduit 166 may include separate conduits for receiving hot and cold water, respectively. Similarly, water supply source 170 may include both hot- and cold-water supplies regulated by dedicated valves. In addition, washing machine appliance 100 may include one or more pressure sensors (not shown) for detecting the amount of water and or clothes within wash tub 108. For example, the pressure sensor may be operably coupled to a side of tub 108 for detecting the weight of wash tub 108, which controller 156 may use to determine a volume of water in wash chamber 110 and a subwasher load weight.

After wash tub 108 is filled and the agitation phase of the wash cycle is completed, wash basket 114 can be drained, e.g., by drain pump assembly 130. Laundry articles can then be rinsed by again adding fluid to wash basket 114 depending on the specifics of the cleaning cycle selected by a user. The impeller or agitation element 132 may again provide agitation within wash basket 114. One or more spin cycles may also be used as part of the cleaning process. In particular, a spin cycle may be applied after the wash cycle and/or after the rinse cycle in order to wring wash fluid from the articles being washed. During a spin cycle, wash basket 114 is rotated at relatively high speeds to help wring fluid from the laundry articles through perforations 126. During or prior to the spin cycle, drain pump assembly 138 may operate to discharge wash fluid from wash tub 108, e.g., to an external drain. After articles disposed in wash basket 114 are cleaned and/or washed, the user can remove the articles from wash basket 114, e.g., by reaching into wash basket 114 through opening 116.

Referring now specifically to FIGS. 2 and 3, washing machine appliance 100 may further include a camera assembly 180 that is generally positioned and configured for obtaining images within wash chamber 110 of washing machine appliance 100. Specifically, according to the illustrated embodiment, camera assembly 180 may include a camera 182 mounted to an underside of door 120 of washing machine appliance 100. In this manner, when door 120 is in the closed position, camera 182 may be positioned over wash chamber 110 and may be oriented for obtaining images within wash chamber 110. Specifically, camera 182 is mounted such that is faces toward a bottom side of wash tub 108. In this manner, camera 182 can take unobstructed images or video of an inside of wash chamber 110, e.g., including images of wash basket 114.

It should be appreciated that camera assembly 180 may include any suitable number, type, size, and configuration of camera(s) 182 for obtaining images of wash chamber 110. In general, cameras 182 may include a lens 184 that is constructed from a clear hydrophobic material or which may otherwise be positioned behind a hydrophobic clear lens. So positioned, camera assembly 180 may obtain one or more images or videos within wash chamber 110, as described in more detail below. It should be appreciated that other locations for mounting camera assembly 180 are possible, such as below or adjacent a discharge nozzle 176 of washing machine appliance 100.

Referring still to FIGS. 2 through 3, washing machine appliance 100 may further include a tub light 186 that is positioned within cabinet 102 or wash chamber 110 for selectively illuminating wash chamber 110 and the load of clothes positioned therein. Specifically, as shown in FIG. 2, tub light 186 may be integrated into camera assembly 180 and may be positioned immediately adjacent camera 182. According to still other embodiments, tub light 186 may be positioned at any other suitable location within cabinet 102. It should be appreciated that according to alternative embodiments, washing machine appliance 100 may include any other camera or system of imaging devices for obtaining images of the load of clothes. In addition, these cameras may be positioned at any suitable location within cabinet 102, may include any suitable lighting features, and may utilize any suitable photography or imaging technology.

Notably, controller 156 of washing machine appliance 100 (or any other suitable dedicated controller) may be communicatively coupled to camera assembly 180, tub light 186, and other components of washing machine appliance 100. As explained in more detail below, controller 156 may be programmed or configured for analyzing the images obtained by camera assembly 180, e.g., in order to determine the turnover performance, and may use this information to make informed decisions regarding the operation of washing machine appliance 100.

Referring still to FIG. 1, a schematic diagram of an external communication system 190 will be described according to an exemplary embodiment of the present subject matter. In general, external communication system 190 is configured for permitting interaction, data transfer, and other communications between washing machine appliance 100 and one or more external devices. For example, this communication may be used to provide and receive operating parameters, user instructions or notifications, performance characteristics, user preferences, or any other suitable information for improved performance of washing machine appliance 100. In addition, it should be appreciated that external communication system 190 may be used to transfer data or other information to improve performance of one or more external devices or appliances and/or improve user interaction with such devices.

For example, external communication system 190 permits controller 156 of washing machine appliance 100 to communicate with a separate device external to washing machine appliance 100, referred to generally herein as an external device 192. As described in more detail below, these communications may be facilitated using a wired or wireless connection, such as via a network 194. In general, external device 192 may be any suitable device separate from washing machine appliance 100 that is configured to provide and/or receive communications, information, data, or commands from a user. In this regard, external device 192 may be, for example, a personal phone, a smartphone, a tablet, a laptop or personal computer, a wearable device, a smart home system, or another mobile or remote device.

In addition, a remote server 196 may be in communication with washing machine appliance 100 and/or external device 192 through network 194. In this regard, for example, remote server 196 may be a cloud-based server 196, and is thus located at a distant location, such as in a separate state, country, etc. According to an exemplary embodiment, external device 192 may communicate with a remote server 196 over network 194, such as the Internet, to transmit/receive data or information, provide user inputs, receive user notifications or instructions, interact with or control washing machine appliance 100, etc. In addition, external device 192 and remote server 196 may communicate with washing machine appliance 100 to communicate similar information.

In general, communication between washing machine appliance 100, external device 192, remote server 196, and/or other user devices or appliances may be carried using any type of wired or wireless connection and using any suitable type of communication network, non-limiting examples of which are provided below. For example, external device 192 may be in direct or indirect communication with washing machine appliance 100 through any suitable wired or wireless communication connections or interfaces, such as network 194. For example, network 194 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 190 is described herein according to an exemplary embodiment of the present subject matter. However, it should be appreciated that the exemplary functions and configurations of external communication system 190 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, and/or different features may also be utilized with the present subject matter as well, e.g., horizontal axis washing machine appliances. In addition, aspects of the present subject matter may be utilized in a combination washer/dryer appliance.

Now that the construction of washing machine appliance 100 and the configuration of controller 156 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as horizontal axis washing machine appliances. In exemplary embodiments, the various method steps as disclosed herein may be performed by controller 156 or a separate, dedicated controller.

Figure 4:
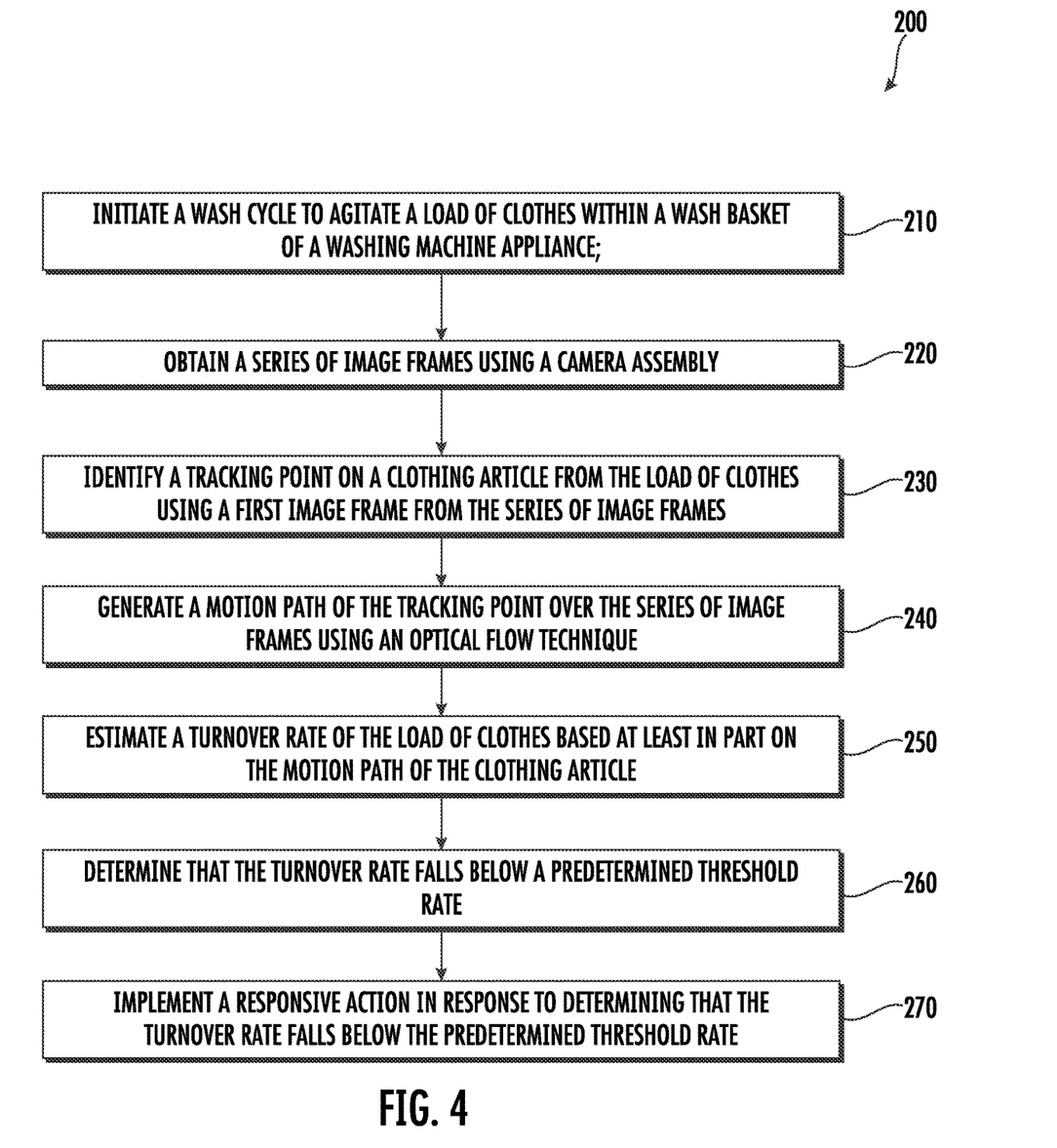
FIG. 4 provides a flow diagram of a portion of a method of using a camera to assess turnover performance in accordance with one embodiment of the present disclosure.

Referring now to FIG. 4, method 200 includes, at step 210, initiating a wash cycle to agitate a load of clothes within a wash basket of a washing machine appliance. In this regard, for example, initiation of a wash cycle generally involves the identification of a variety of wash parameters based on the type of wash cycle desired. For example, the load size for a given wash may be associated with a predetermined targeted water level within the wash tub. In another example, the agitation profile, which may depend upon the wash cycle type (e.g., delicates, heavy-duty, etc.), may be associated with a predetermined intensity of movement targeted by the agitation element or impeller, such as, for example, the agitator ramp up speed or the length of time the agitator is activated. In still other examples, the temperature setting of the washing machine appliance may be associated with a given water temperature to be used with each particular setting. Accordingly, at step 210, a wash cycle may be initiated employing the predetermined parameters associated with the various settings for the particular cycle.

Continuing the example from above, at the beginning of the wash cycle, water control valve 172 may be regulated to supply wash fluid into wash tub 108 after the load of clothes has been added to wash basket 114. Motor assembly 138 may be activated when the wash fluid reaches the desired fill level in order to agitate and clean the load of clothes within wash basket 114. More specifically, agitation may be achieved by selectively rotating wash basket 114 and/or agitation element 132, thereby generating turnover of the load of clothes within wash basket 114. As explained above, turnover is generally a measure of the movement of articles of clothing within wash basket 114 during a wash or agitation cycle. According to an exemplary embodiment, washing machine appliances that include central agitation element, e.g., such as washing machine appliance 100, facilitate a turnover process where the clothes at the top of wash basket 114 generally move inward along the radial direction R, are then driven downward along the vertical direction V by the agitation element, outward along the radial direction R proximate a bottom wall of wash basket 114, and then back up along the vertical direction V proximate an outer wall of wash basket 114. By contrast, washing machine appliances without a central agitation element may typically generate cloth turnover in the opposite direction, e.g., up the center and down at an outer wall of the wash basket.

Step 220 generally includes obtaining a series of image frames using a camera assembly. In this regard, for example, camera assembly 180 may obtain one or more images, a series of frames, a video, or any other suitable visual representation of the load of clothes using camera assembly 180. As will be explained in more detail below, this series of image frames may be used to monitor the motion or turnover of the load of clothes within wash basket 114.

According to the illustrated embodiment, wash basket 114 includes bottom wall 400 and a cylindrical outer wall 402 which collectively define at least a portion of wash chamber 110. As illustrated, camera assembly 180 is generally mounted above wash basket 114 and has a field of view directed toward bottom wall 400 of wash basket 114. For example, according to the illustrated embodiment, camera assembly 180 is positioned directly over a center 404 a bottom wall 400 of wash basket 114. According to such an embodiment, the field of view of camera assembly 180 may be directed directly down along the vertical direction V toward center 404 of bottom wall 400.

Step 230 may generally include identifying a tracking point on a clothing article from the load of clothes using a first image frame from the series of image frames. In this regard, as a starting point for monitoring the motion of the load of clothes within a wash basket, the first image frame of the series of image frames may be used to identify a specific location or feature on a specific garment within the load of clothes for tracking purposes. For example, referring briefly to FIG. 5, a first image frame 410 of the series of images is provided and shows a load of clothes 412 illustrated within a wash basket 414 according to an exemplary embodiment of the present subject matter. A tracking point 416 may be identified using any suitable image processing technique or analysis, examples of which may be described below.

Figure 5:
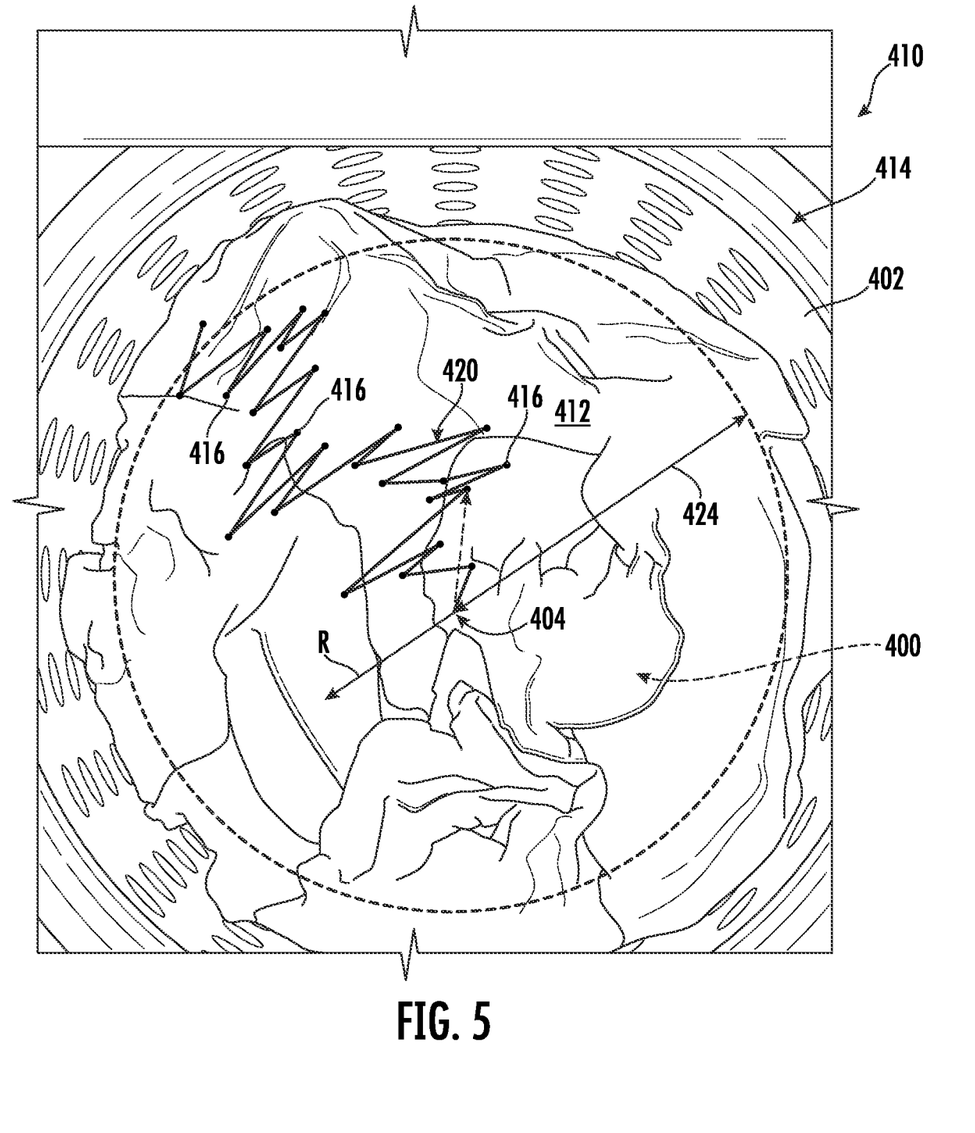
FIG. 5 provides a first image frame of a series of image frames obtained by a camera assembly along with an exemplary motion path of a tracking point on an article of clothing according to an exemplary embodiment of the present subject matter.

According to the illustrated embodiment, wash basket 414 does not include a central agitation element. Accordingly, the movement of the load of clothes during proper agitation may typically be from the center 404 outward along the radial direction R when viewed by camera assembly 180. Accordingly, step 230 of identifying the tracking point may include identifying a tracking point proximate center 404 of wash basket 414. However, as explained above, tracking point 416 may instead be selected at other locations within the first image frame 410, e.g., when the anticipated motion of the load of clothes is different, e.g., such as in a washing machine appliance including an agitator within the wash basket (e.g., such as washing machine appliance 100).

Referring again to FIG. 4, step 240 may generally include generating a motion path of the tracking point over the series of image frames using an optical flow technique. In this regard, by analyzing the series of image frames, the tracking point 416 on load of clothes 412 may be identified in each frame, and the path of travel of that specific point may be determined. A schematic representation of the motion path of tracking point 416 through a series of image frames is provided within a horizontal plane in FIG. 5 and identified generally by reference numeral 420. In this regard, motion path 420 generally begins at center 404 of wash basket 414 and slowly moves outward along the radial direction R (e.g., including various circumferential oscillations imparted by the rotating wash basket 414) toward outer wall 402 of wash basket 414. It should be appreciated that motion path 420 illustrated in FIG. 5 is overlaid on wash basket 414 only for purposes of describing aspects of the present subject matter. The motion path 420 is only exemplary and may vary while remaining within the scope of the present subject matter.

As used herein, the terms "optical flow" and the like are generally intended to refer to any suitable process for analyzing a series of image frames or processing a video for tracking a target object or point. These algorithms or techniques may be used to track the motion of object, surfaces, edges, corners, etc. in a two-dimensional or three-dimensional space. This technique may be applied to a series of images or video frames that have a small time step between them and may include calculating a velocity for points within the images as well as an estimation of where points could be in the next frame. For example, an optical flow algorithm may generally analyze or track the pixels of consecutive frames of a video file to track a specific point or object within the video. This optical flow algorithm may be implemented using camera assembly 180 and controller 156 or may be implemented using a remote analysis device (e.g., located on remote server 196).

Various optical flow algorithms may be utilized according to exemplary embodiments of the present subject matter. In this regard, for example, suitable flow algorithms may include dense optical flow (e.g., which may estimate flow vectors for all pixels within a frame), sparse optical flow (e.g., which may estimate flow vectors for pixels containing objects of interest, edges, corners, etc.), or variations therebetween. According to still other embodiments, optical flow techniques may include phase correlation, block-based methods, discrete optimization methods, or differential methods of estimating optical flow (e.g., based on partial derivatives of the image signal and/or the sought flow field and higher-order partial derivatives). For example, differential methods may include a Lucas-Kanade method, a Horn-Schunck method, a Buxton-Buxton method, a Black-Jepson method, and/or general variational methods (e.g., modifications or extension of the methods described herein).

In addition, or alternatively, various techniques for identifying tracking points within a region of interest may be used, such as Shi-Tomasi corner detection, Harris corner detection, Farneback optical flow, Lucas-Kanade techniques, or any other suitable techniques may be used. It should be appreciated that other known techniques of optical flow analysis are possible and within the scope of the present subject matter. Corner detection methods may be used to identify corners or edges for use as tracking points. In general, corner detections may include, but are not limited to Moravec corner detection algorithms, Harris and Stephens corner detection algorithms, Shi-Tomasi corner detection algorithms, Förstner corner detection algorithms, multi-scale Harris operators, level curve curvature approaches, Laplacian of Gaussian methods, Wang and Brady corner detection algorithms, SUSAN (smallest uni-value segment assimilating nucleus) methods, Trajkovic and Hedley corner assimilating nucleus, AST-based (accelerated segment test) feature detectors, or any other suitable corner detection method known to one having ordinary skill in the art, or combinations therebetween.

One exemplary implementation of the optical flow technique includes the use of a frame-by-frame analysis of a specific pixel window that includes the target tracking point. In this regard, for example, a target tracking point may be identified in the first frame along with a pixel window surrounding the tracking point (e.g., with the tracking point as its center). The size of the pixel window may vary depending on the projected movement of the tracking point, but for purposes of explanation may be a 20×20 pixel window (i.e., 400 total pixels). For the second frame, the optical flow process may analyze the original pixel window from the first frame to again identify the tracking point, which has now moved from the center of the pixel window. A new pixel window with the new tracking point may be identified and the process may proceed through the series of image frames to track the coordinates or location of the tracking point over time.

Referring again to FIG. 4, step 250 includes estimating a turnover rate of the load of clothes based at least in part on the motion path of the clothing article. In this regard, for example, the motion path 420 obtained at step 240 may generally include a plurality of coordinates and corresponding timestamps of tracking point 416 as it moves through the series of image frames. Accordingly, now that the motion path 420 of the load of clothes 412 is known, this data may be used to estimate the turnover rate of the load of clothes 412 during the wash cycle.

As described above, a single tracking point 416 is used to generate a single motion path 420 for determining turnover rate. However, it should be appreciated that according to alternative embodiments, multiple motion paths 420 may be used to obtain a more accurate estimation of the turnover rate. For example, method 200 may include identifying a plurality of tracking points from the load of clothes from within the first image frame 410 and may simultaneously track these tracking points 416 to generate motion paths 420 for each tracking point over the series of images. The data associated with each of these motion paths may be averaged for an improved estimation of the turnover of the load of clothes 412. For example, according to exemplary embodiments, method 200 may include simultaneously tracking between 10 and 200 tracking points, between 20 and 100 tracking points, or about 50 tracking points.

In addition, as explained above, articles of clothing may eventually be drawn down into wash basket 414 such that they are no longer in view of camera assembly 180. Accordingly, method 200 may include a procedure for resetting the tracking point 416 when this occurs. For example, according to an exemplary embodiment, method 200 may include monitoring a movement distance (e.g., as identified by reference numeral 422 in FIG. 5) of tracking point 416 through each of the series of image frames. According to an exemplary embodiment, this movement distance 422 may be measured along the radial direction R between center 404 and tracking point 416 and may be recalculated at each frame.

According to an exemplary embodiment method 200 may include resetting the tracking point at a new location or on a new clothing article positioned at center 404 of wash basket 414 when the movement distance 422 of tracking point 416 exceeds a movement threshold 424. For example, because the radial distance between center 404 and outer wall 402 of wash basket 414 is fixed, tracking point 416 may be reset as movement distance 422 approaches that radial distance or some other suitable threshold. For example, movement threshold 424 is illustrated schematically in FIGS. 5 and 6. Specifically, referring to FIG. 6, movement threshold 424 may be approximately 400 pixels along the radial direction within the series of images, which may correspond to a radial distance. It should be appreciated that this threshold may be selected at any suitable radial position. Such as between about 80% and 100% of the radial distance between center 404 and outer wall 402 of wash basket 414.

In addition, although the process of resetting tracking point 416 is described herein with reference to wash basket 414, it should be appreciated the process may vary for a wash basket that includes an agitator that generally facilitates cloth movement from the outside toward a center of the wash basket. Specifically, according to such an embodiment, the tracking point may be reset when falls inside a predetermined radial distance defined around the center of the wash basket. It should be appreciated that other methods of resetting one or more tracking points are possible and within the scope of the present subject matter.

Figure 6:
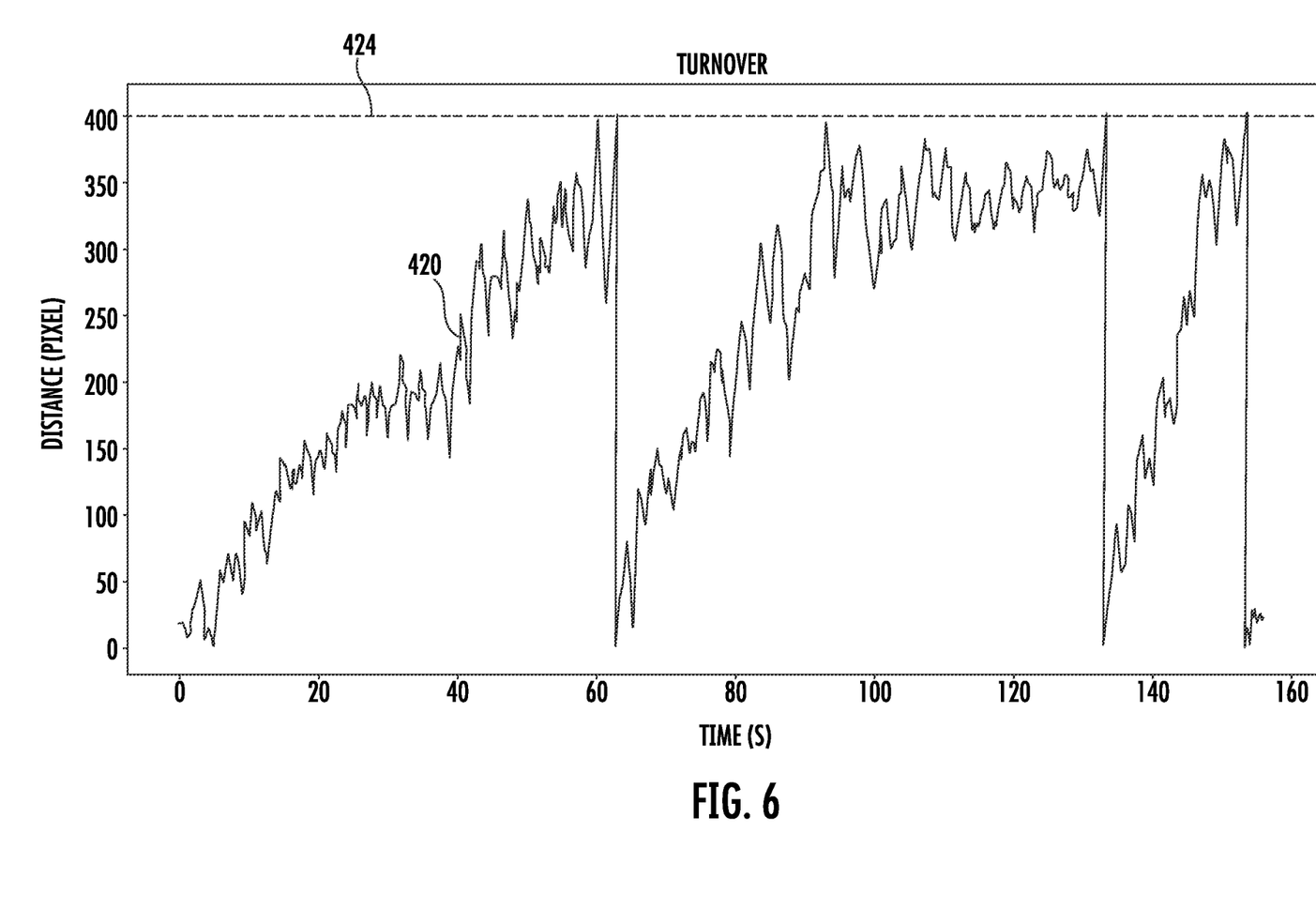
FIG. 6 provides a plot of the movement of a tracking point moving from a center of the wash basket outward along a radial direction as a load of clothes is turned over in the wash basket according to an exemplary embodiment of the present subject matter.

Referring now briefly to FIG. 6, the movement of tracking point 416 over time is illustrated for three different tracking points 416. Specifically, at t=0, tracking point 416 is set at approximately zero pixels from center 404. Between 0 and 60 seconds, tracking point 416 slowly moves outward along the radial direction R until movement threshold 424 is reached, e.g., at around 62 seconds. At this point, tracking point 416 is reset and is once again moved outward radially until the movement threshold is once again reached at around 133 seconds. Tracking point 416 is reset and moves outward slightly quicker while tracking the third cycle of tracking point 416. By repeating this process for numerous tracking points over various resetting time periods, and averaging the time needed to reach the movement threshold 424, an accurate estimate of the movement rate of the load of clothes may be obtained.

Referring again to FIG. 4, step 260 may generally include determining that the turnover rate falls below a predetermined threshold rate. In this regard, the predetermined threshold rate may correspond to a minimum desired rate of movement (e.g., turnover) of the load of clothes for facilitating suitable agitation and cleaning action for a given operating cycle and parameters. This predetermined threshold rate may be programmed by the manufacturer, set by the user, and may be dependent on a variety of operating parameters or conditions. For example, according to an exemplary embodiment, the predetermined threshold rate may be based on at least one of a load size, a load type, a cycle selection, etc.

Step 270 may generally include implementing a responsive action in response to determining that the turnover rate falls below a predetermined threshold rate. In this regard, if steps 210 through 260 result in a determination that the turnover rate is not sufficient, washing machine appliance 100 may implement various responsive actions to rectify the condition and improve the washing performance. For example, according to an exemplary embodiment, implementing the responsive action may include adjusting at least one operating parameter of the washing machine appliance 100.

According to exemplary embodiments, washing machine appliance 100 may include a water supply (e.g., including water supply source 170 and water control valve 172), and implementing the responsive action may include operating water supply to increase a water level within the wash tub. By contrast, washing machine appliance 100 may include a drain pump 130 and implementing the responsive action may include operating the drain pump to decrease a water level within the wash tub. According to still other embodiments, implementing a responsive action may include operating motor assembly 138 to adjust a wash basket speed, an agitation profile, and/or an agitation intensity of the wash cycle. Other suitable adjustments are possible, such as adjusting the duration or cycle time of the wash cycle, water temperatures, etc.

According to exemplary embodiments, method 200 may further include monitoring the turnover rate and adjusting the wash cycle duration based on the turnover rate and the implied agitation or cleaning effectiveness of the wash cycle. In this regard, for example, method 200 may include monitoring a number of turnovers of a load of clothes using the turnover rate (e.g., as determined at step 250). Based on the turnover rate, the effectiveness of the washing cycle may be determined and the wash cycle duration may be adjusted accordingly. It should be appreciated that this may also be adjusted based on the initial soil level or stain level of the load of clothes. Thus, method 200 may include automatically stopping a wash cycle or otherwise adjusting the duration of the wash cycle based on the soil level and the cleaning effectiveness as determined by the turnover rate.

In addition, or alternatively, step 270 of implementing a responsive action may include providing a user notification in the event that the desired turnover rate of the load of clothes cannot be achieved. In this regard, method 200 may include determining that the turnover rate has failed to exceed the predetermined threshold rate within a predetermined time period. This may be indicative of the fact that washing machine appliance 100 has been unable to correct the turnover issues related with the wash cycle. Accordingly, step 270 may include providing a user notification that the issues with turnover have not been rectified.

It should be appreciated that the user notification may be provided to the user from any suitable source and in any suitable manner. For example, according to exemplary embodiments, the user notification may be provided through control panel 150 so that the user may be aware of the issue (e.g., such as via an illuminated warning indicator, an image displayed on a screen, etc.). In addition, or alternatively, controller 156 may be configured to provide a user notification to a remote device, such as remote device 192 via a network 194. For example, the user notification may include a pop-up notification on a user's cell phone or other remote device and may include a display of the one or more images or videos of the load of clothes.

Figure 7:
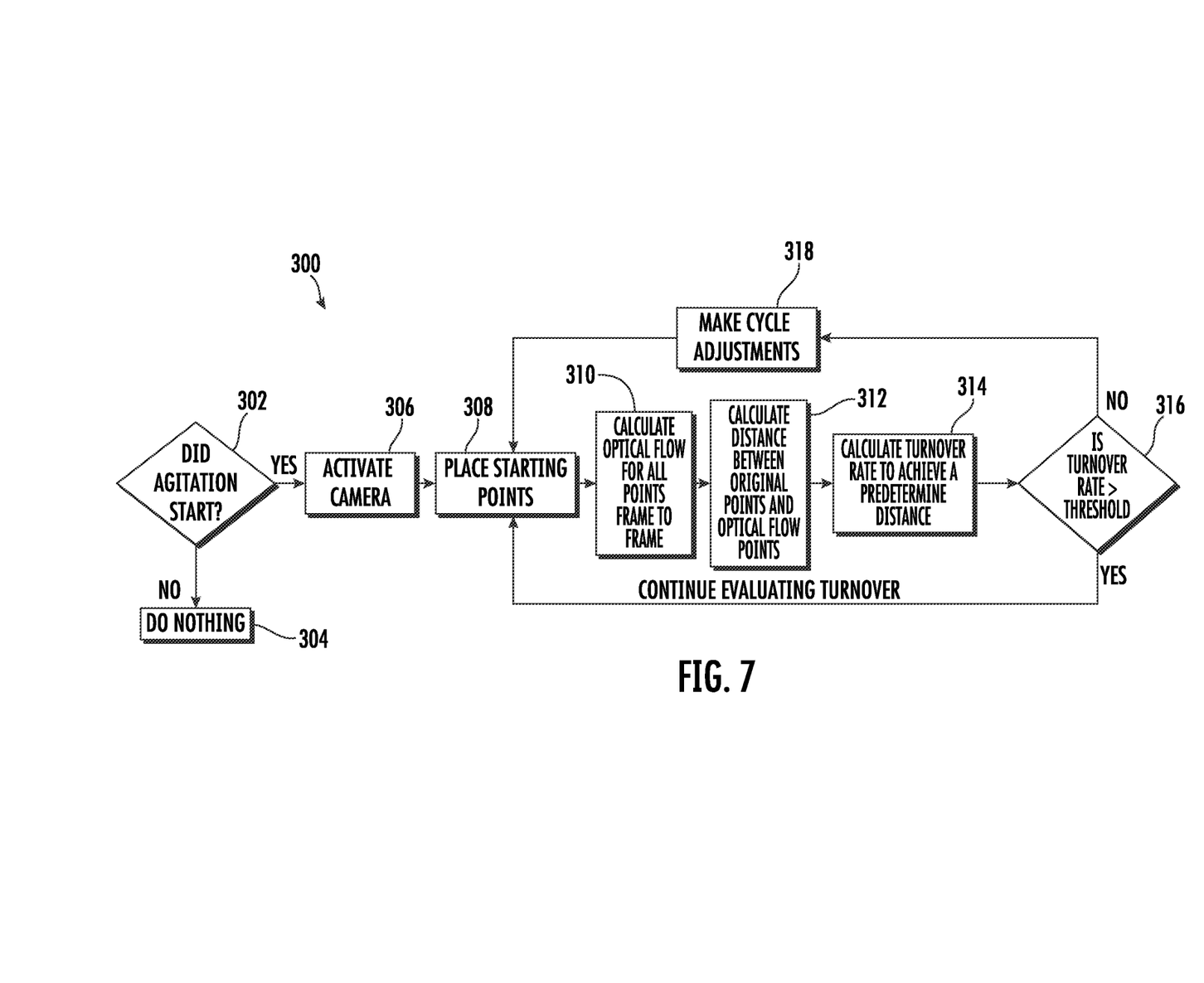
FIG. 7 provides a flow diagram of a turnover assessment method in accordance with one embodiment of the present disclosure.

Referring now briefly to FIG. 7, an exemplary flow diagram of a turnover assessment method 300 that may be implemented by washing machine appliance 100 will be described according to an exemplary embodiment of the present subject matter. According to exemplary embodiments, method 300 may be similar to or interchangeable with method 200 and may be implemented by controller 156 of washing machine appliance 100. As shown, at step 302, controller 156 may include determining whether an agitation cycle has started. If an agitation cycle has not started, step 304 may include doing nothing.

By contrast, if step 304 results in a determination that agitation has begun (e.g., a wash cycle is being performed), step 306 may include activating the camera (e.g., camera assembly 180) to obtain the first image frame. Step 308 may include placing starting points on the load of clothes that will be tracked to generate a motion path (e.g., one or more tracking points 416). Step 310 may generally include calculating the optical flow for each tracking point. In this regard, as explained above, optical flow techniques may be used to generate a motion path for each of the tracking points. Step 312 may include calculating the distance between the original point (e.g., center 404) in the tracking point at each of the image frames using this motion path and step 314 may include calculating or estimating a turnover rate.

Step 316 may include determining whether the estimated turnover rate exceeds some predetermined threshold. If the turnover rate exceeds that threshold, e.g., such that the turnover rate is suitable for a given wash cycle and the agitation is sufficient, method 300 may proceed back to step 308 where the turnover continues to be evaluated during the wash cycle. By contrast, if step 316 results in a determination that the turnover rate has not exceeded the desired threshold, step 318 may include implementing a responsive action, such as making cycle adjustments, providing user notifications, etc.

FIGS. 4 and 7 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 and method 300 are explained using washing machine appliance 100 as an example, it should be appreciated that this method may be applied to the operation of any suitable laundry appliance, such as another washing machine appliance.

As explained above, aspects of the present subject matter are directed to a method of measuring a turnover rate within a washing machine using a camera fixed in the unit and pointing towards a load during agitation. Cloth movements may be tracked by placing a set of points in the center for impeller models since the starting point of cloth movement in impeller models is in the center. For agitator models, starting points may be placed on circumference close to basket walls. The starting point placement may be fixed every time or using a corner detection method like Shi Tomasi corner detection or Harris corner detection to locate good features to track in the specified starting region of interest (ROI). The ROI can be different based on the washer model (impellor vs. agitator models). After starting points are placed, Lucas-Kanade method may be used to calculate optical flow while agitation is in progress. The turnover rate may be estimated by calculating distance from the starting points to the new point's generated using optical flow during agitation. The points may reset to their starting location based on the distance threshold (e.g., the radial distance the point has traveled) or after a fixed time as the agitation process continues. Based on the turnover rate, agitation profile and water level may be adjusted to maximize turnover rate which in turn will improve washing performance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:
a wash tub positioned within a cabinet;
a wash basket rotatably mounted within the wash tub and defining a wash chamber configured for receiving a load of clothes;
a motor assembly mechanically coupled to the wash basket for selectively rotating the wash basket;
a camera assembly mounted within the cabinet in view of the wash chamber; and
a controller operably coupled to the motor assembly and the camera assembly, the controller being configured to:
initiate a wash cycle to agitate the load of clothes;
obtain a series of image frames using the camera assembly;
identify a tracking point on a clothing article from the load of clothes using a first image frame from the series of image frames;
generate a motion path of the tracking point over the series of image frames using an optical flow technique;
estimate a turnover rate of the load of clothes based at least in part on the motion path of the clothing article;
determine that the turnover rate falls below a predetermined threshold rate; and
implement a responsive action in response to determining that the turnover rate falls below the predetermined threshold rate.

2. The washing machine appliance of claim 1, wherein the tracking point of the motion path is identified at a center of the wash basket using a corner detection algorithm in the first image frame and wherein the motion path passes from the center outward along a radial direction.

3. The washing machine appliance of claim 2, wherein the controller is further configured to:
monitor a movement distance of the tracking point to the center of the wash basket; and
reset the tracking point to a new clothing article positioned at the center of the wash basket when the movement distance exceeds a movement threshold.

4. The washing machine appliance of claim 3, wherein the movement threshold is between about 80% and 100% of a radial distance between the center of the wash basket and an outer wall of the wash basket.

5. The washing machine appliance of claim 1, wherein the washing machine appliance comprises:
an agitation element positioned within the wash basket, and wherein the tracking point of the motion path is identified proximate an outer wall of the wash basket using a corner detection algorithm in the first frame and the motion path passes toward a center of the wash basket along a radial direction.

6. The washing machine appliance of claim 5, wherein the controller is further configured to:
determine when the tracking point has reached the center of the wash basket; and
reset the tracking point to a new clothing article positioned proximate the outer wall.

7. The washing machine appliance of claim 1, wherein the motion path comprises a plurality of coordinates and corresponding timestamps of the tracking point as it moves through the series of image frames.

8. The washing machine appliance of claim 1, wherein the wash basket further includes a bottom wall, and wherein the camera assembly is mounted above the wash basket and has a field of view directed to the bottom wall of the wash basket.

9. The washing machine appliance of claim 1, wherein the predetermined threshold rate is based on at least one of a load size, a load type, or a cycle selection.

10. The washing machine appliance of claim 1, wherein the controller is further configured to:
identify a plurality of tracking points from the load of clothes using a first image frame from the series of image frames;
generate a motion path for each of the plurality of tracking points over the series of image frames using an optical flow technique;
estimate an average turnover rate of the load of clothes based at least in part on the motion path for each of the plurality of tracking points;
determine that the average turnover rate falls below the predetermined threshold rate; and
implement the responsive action in response to determining that the average turnover rate falls below the predetermined threshold rate.

11. The washing machine appliance of claim 10, wherein the plurality of tracking points comprises between 20 and 100 tracking points.

12. The washing machine appliance of claim 1, further comprising:
a water supply for providing a flow of wash fluid into the wash tub, wherein implementing the responsive action comprises operating the water supply to increase a water level within the wash tub.

13. The washing machine appliance of claim 1, further comprising:
a drain pump for selectively discharging wash fluid from a sump of the wash tub, wherein implementing the responsive action comprises operating the drain pump to decrease a water level within the wash tub.

14. The washing machine appliance of claim 1, wherein implementing the responsive action comprises operating the motor assembly to adjust an agitation profile or and agitation intensity.

15. The washing machine appliance of claim 1, wherein implementing the responsive action comprises operating the motor assembly to adjust basket speed.

16. The washing machine appliance of claim 1, wherein implementing the responsive action comprises adjusting a cycle time of the wash cycle.

17. The washing machine appliance of claim 1, wherein the controller is further configured to:
   monitor a number of turnovers of the load of clothes using the turnover rate; and
   stop the wash cycle when the number of turnovers exceeds a predetermined number of turnovers is completed.

18. The washing machine appliance of claim 1, wherein the controller is further configured to:
   determine that the turnover rate fails to exceed the predetermined threshold rate within a predetermined time period; and
   provide a user notification that that the turnover rate has failed to exceed the predetermined threshold rate within a predetermined time period.

19. The washing machine appliance of claim 1, wherein the washing machine appliance is a vertical axis washing machine appliance.

20. A method of operating a washing machine appliance, the washing machine appliance comprising a wash basket rotatably mounted within a wash tub and defining a wash chamber configured for receiving a load of clothes, a motor assembly for selectively rotating the wash basket, and a camera assembly mounted within view of the wash chamber, the method comprising:
   initiating a wash cycle to agitate the load of clothes;
   obtaining a series of image frames using the camera assembly;
   identifying a tracking point on a clothing article from the load of clothes using a first image frame from the series of image frames;
   generating a motion path of the tracking point over the series of image frames using an optical flow technique;
   estimating a turnover rate of the load of clothes based at least in part on the motion path of the clothing article;
   determining that the turnover rate falls below a predetermined threshold rate; and
   implementing a responsive action in response to determining that the turnover rate falls below the predetermined threshold rate.

* * * * *